United States Patent [19]

Okamura et al.

[11] 4,187,998
[45] Feb. 12, 1980

[54] TAPE CASSETTE

[75] Inventors: Masatoshi Okamura; Haruo Shiba, both of Tokyo, Japan

[73] Assignee: TDK Electronics Company, Limited, Tokyo, Japan

[21] Appl. No.: 929,503

[22] Filed: Jul. 31, 1978

[30] Foreign Application Priority Data

Nov. 24, 1977 [JP] Japan .............................. 52-157730[U]

[51] Int. Cl.² .......................... G03B 1/04; G11B 23/06
[52] U.S. Cl. .......................................... 242/199; 16/73
[58] Field of Search ................................ 242/197–200; 16/72, 73; 360/85, 96, 132; 206/387, 389–393; 352/72, 78 R, 78 C, 130

[56] References Cited

U.S. PATENT DOCUMENTS

| | | | |
|---|---|---|---|
| 2,676,766 | 4/1954 | Ross et al. | 242/76 |
| 3,677,497 | 7/1972 | Lowry et al. | 242/199 |
| 3,873,046 | 3/1975 | Thevenaz | 242/199 |
| 3,910,692 | 10/1975 | Scibilia | 352/130 |

Primary Examiner—Leonard D. Christian
Attorney, Agent, or Firm—Oblon, Fisher, Spivak, McClelland & Maier

[57] ABSTRACT

A tape cassette comprises a locking mechanism for locking a cover for protecting a tape. The locking mechanism comprises a plate spring whose one end is fixed to a rib mounted on a half case and whose other end is pressed to a lock plate.

4 Claims, 4 Drawing Figures

TAPE CASSETTE

BACKGROUND OF THE INVENTION

The present invention relates to a tape cassette and particularly, it relates to a video tape cassette.

Recently, magnetic tapes have been used in the form of a tape cassette.

In the case of the video tape cassette, it is usual to use a cover for covering a magnetic tape during the time that the magnetic tape is not used because of the severe requirements of the condition of the video tape.

The cover is usually actuated by a spring in the direction of opening the cover but the cover is usually locked with a locking mechanism during the time that the cover is closed.

Heretofore, a coil spring has been used as the spring for the locking mechanism. However, the coil spring is not easy to assemble in the tape cassette because of its structure whereby the cost of the tape cassette is increased by using the coil spring.

SUMMARY OF THE INVENTION:

It is an object of the present invention to provide a tape cassette which can be easily assembled at low cost.

It is another object of the present invention to provide a tape cassette in which a plate spring (a laminated spring or a leaf spring) is assembled in the locking mechanism instead of the coil spring.

The foregoing and the other objects of the present invention have been attained by providing a tape cassette comprising a locking mechanism for opening and closing a cover which comprises a plate spring whose one end is fixed on a rib mounted on a half case and whose other end is pressed to a lock plate.

DETAILED DESCRIPTION OF THE PREFERRED EMBODIMENTS

Figure 1:
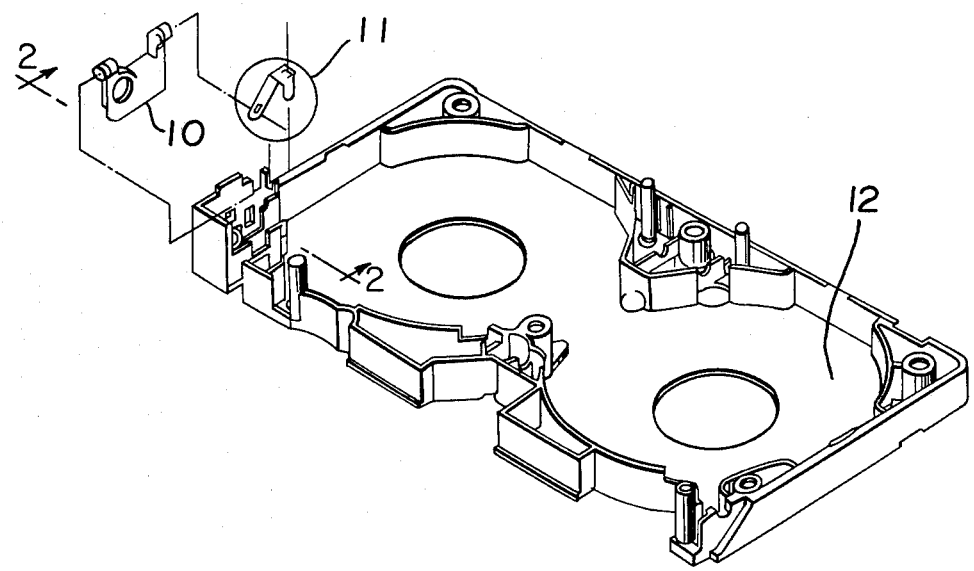
FIG. 1 is a schematic view of one embodiment of a tape cassette according to the present invention.
Figure 2:
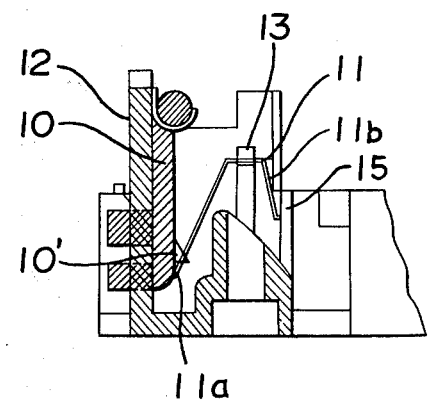
FIG. 2 is a partially enlarged sectional view of the embodiment of FIG. 1.
Figure 3:
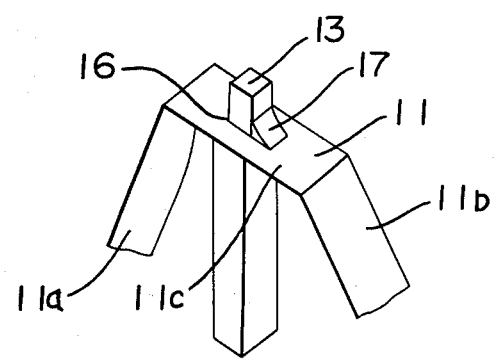
FIG. 3 is a schematic view of a partially enlarged view of the locking mechanism.
Figure 4:
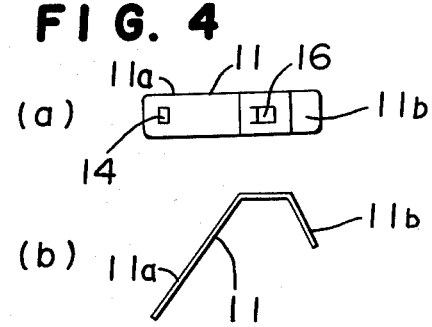
FIG. 4 is a plan view (a) and a front view (b) of a plate spring.

Referring to the drawings, one embodiment of the present invention will be illustrated.

FIG. 1 is a schematic view of one embodiment of the tape cassette of the present invention wherein the reference 11 designates a plate spring whose one end 11a, is engaged with a lock plate (10) of a cover for opening and closing the tape (not shown). The reference (14) designates a hole formed on the one end (11a) of the plate spring and a projected part (10') of the lock plate (10) is fitted in the hole (14) to complete the engagement of the plate spring with the lock plate (10).

The other end (11b) of the plate spring is pressed against a side wall (15) of the half case (12). The reference (16) designates a rectangular hole especially a square hole formed at a center of the plate spring (11) and a rib (13) having a square shape mounted on the half case (12) is fitted to the hole (16) to fix the plate spring (11). The reference (17) designates a bent part or hook formed at the peripheral part of the square hole (16) and the plate spring (11) is further fixed to the rib (13) by pressing the rib (13) against the bent part or hook (17) to cause a complete fixing. It is possible that the rib (13) is formed in a form of a round rod and the hole (16) is formed in a round shape and the rib (13) and the hole (16) are fixed by the other means such as a screw. However, it is easier to fix the rib (13) to the hole (16) where the shapes of the rib (13) and the hole (16) are in a square form.

Where the rib (13) is completely fixed to the plate spring (11), it is not necessary to form the other end (11b) of the plate spring (11) which is pressed against the side wall (15) of the half case (12).

The other parts of the tape cassette especially the video tape cassette such as the half cases, a reel, a guide driving rolls, a tape clamping etc. are the same as those of the conventional tape cassette and these structures can be easily understood by a person skilled in the art.

In accordance with the present invention, a plate spring is used for locking the cover for opening and closing the tape cassette whereby the structure of the tape cassette can be simple and the assembling operation for the tape cassette can be easy and these facts significantly affect the cost of the product of the tape cassette.

What is claimed is:

1. A tape cassette comprising:
    a half case for housing a tape;
    a rib mounted on the half case;
    a lock plate;
    means for attaching the lock plate to a cover for the half case;
    a plate spring fixed to the rib and having one end engagable with the lock plate when the half case is closed by the cover.

2. The tape cassette recited in claim 1 wherein:
    the half case has a side wall, the other end of the plate spring is pressed against the side wall, and a central part of the plate spring is fixed to the rib.

3. The tape cassette recited in claim 1 wherein: a central part of the plate spring has a rectangular hole therein and the rib has a rectangular shape fitted to the rectangular hole.

4. The tape cassette recited in claim 3 including: a bent part at the periphery of the rectangular hole for fixing the plate spring to the rib by pressing the rib against the bent part.

* * * * *